(12) United States Patent
Togami, Jr.

(10) Patent No.: US 8,700,998 B2
(45) Date of Patent: Apr. 15, 2014

(54) FOREIGN LANGUAGE TRANSLATION TOOL

(75) Inventor: Warren I. Togami, Jr., Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1054 days.

(21) Appl. No.: 11/565,622

(22) Filed: Nov. 30, 2006

(65) Prior Publication Data
US 2008/0133216 A1    Jun. 5, 2008

(51) Int. Cl.
*G06F 17/28* (2006.01)

(52) U.S. Cl.
USPC ............... 715/264; 715/265; 704/2; 704/7

(58) Field of Classification Search
USPC ................. 715/264–265; 704/2, 7
See application file for complete search history.

(56) References Cited

U.S. PATENT DOCUMENTS

| | | | |
|---|---|---|---|
| 5,515,490 A * | 5/1996 | Buchanan et al. | 715/209 |
| 5,659,765 A * | 8/1997 | Nii | 704/4 |
| 5,852,798 A * | 12/1998 | Ikuta et al. | 704/2 |
| 5,999,728 A * | 12/1999 | Cable | 717/105 |
| 6,275,790 B1 * | 8/2001 | Yamamoto et al. | 704/8 |
| 6,918,125 B1 * | 7/2005 | Skinner et al. | 719/329 |
| 7,496,501 B2 * | 2/2009 | Xun et al. | 704/9 |
| 7,536,294 B1 * | 5/2009 | Stanz et al. | 704/3 |
| 7,719,535 B2 * | 5/2010 | Tadokoro et al. | 345/467 |
| 2002/0175937 A1 * | 11/2002 | Blakely et al. | 345/744 |
| 2003/0046059 A1 * | 3/2003 | Litster et al. | 704/8 |
| 2003/0081017 A1 * | 5/2003 | Shenassa et al. | 345/866 |
| 2004/0049374 A1 * | 3/2004 | Breslau et al. | 704/2 |
| 2005/0050526 A1 * | 3/2005 | Dahne-Steuber et al. | 717/136 |
| 2006/0130006 A1 * | 6/2006 | Chitale | 717/136 |
| 2006/0130026 A1 * | 6/2006 | McHugh et al. | 717/141 |
| 2006/0195831 A1 * | 8/2006 | Bossom et al. | 717/162 |
| 2007/0269775 A1 * | 11/2007 | Andreev et al. | 434/156 |
| 2008/0201696 A1 * | 8/2008 | Atkin et al. | 717/137 |

OTHER PUBLICATIONS

Hammond et al.; Python Programming on Win32; O'Reilly Media, Inc.; Jan. 24, 2000; § 3.2.2.*

Yunker, John; Beyond Borders: Web Globalization Strategies; New Riders Publishing; Aug. 22, 2002; Fig. 9.13.*

* cited by examiner

*Primary Examiner* — Andrew Dyer

(74) *Attorney, Agent, or Firm* — Lowenstein Sandler LLP

(57) ABSTRACT

Embodiments of the present invention provide a foreign language translation tool that assists in the localization of an application. In particular, the foreign language translation tool enables translation in the context of a running application. In addition, the tool provides an editing mechanism so that the user may modify or correct the translation of the selected text and allows the user to easily and quickly verify the correctness of translations.

17 Claims, 4 Drawing Sheets

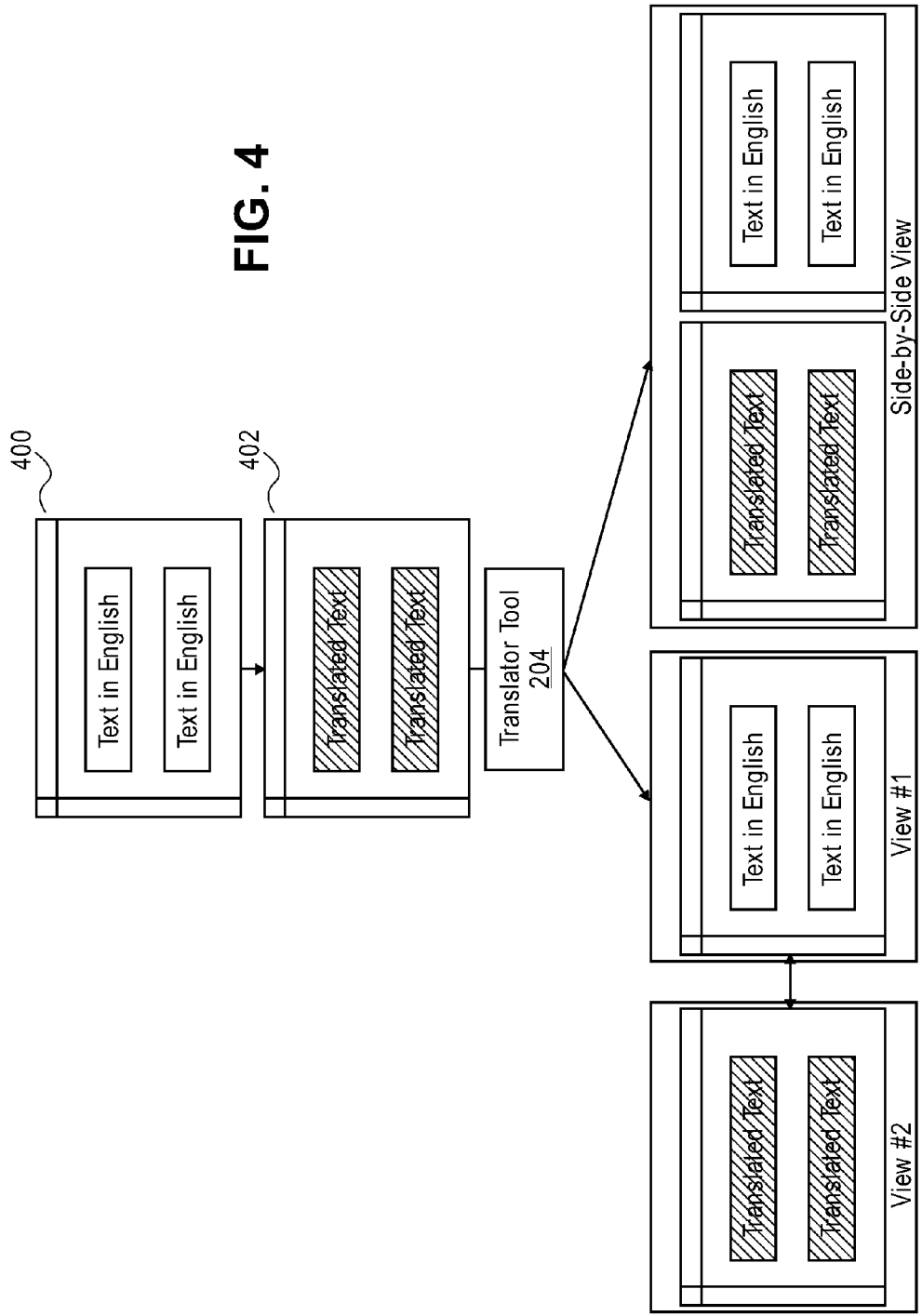

FOREIGN LANGUAGE TRANSLATION TOOL

FIELD OF THE INVENTION

The present invention relates generally to the localization of software applications.

BACKGROUND OF THE INVENTION

Increasingly, non-English speaking countries are deploying software. However, software has typically been designed with little or no thought towards internationalization or localization. Instead, software has been predominantly developed using English as the primary language for its interface. Nonetheless, as the international market for software grows, there is a need in improving the process of internationalization and localization of a software product for global use. Internationalization is the adaptation of products for potential use globally. Software localization is a process of translating software user interfaces from one natural language to another and adapting it to suit a foreign culture.

In order to perform localization, the current prevailing practice is for applications to place text in resource strings, which are loaded during program execution as needed. These strings, stored in resource files, are intended to be relatively easy to translate. Programs are then built to reference resource files depending on the desired language. For example, Linux and UNIX programs use the well known "gettext" internationalization library.

Thus, to get an application to support multiple languages one would design the application to select the relevant language resource file at runtime. Resource files are translated to the required languages. This method is application-specific.

Unfortunately, accurate localization of a software application is a difficult, time and labor intensive process. This process often requires significant effort from development teams. There are tools that can simplify the localization process. However, even with these tools, a software vendor must essentially manually "translate" software for international use. Typically, a developer must undergo a tedious multi-step process to perform and verify translations. For example, the developer must edit the resource file, compile it, and restart the application to verify their changes. When translating the resource strings, the intended meaning is difficult to ascertain. This is because the developer does not have the benefit of viewing the strings in the context of the running application. This technique has generally led to poor translations or translations that do not make sense at certain points within the application.

For example, the English language includes many homonyms, which are words having the same sound and spelling but have different meanings. This makes translating English a difficult process because it requires repeated testing and verification.

Therefore, it would be desirable to provide an improved foreign language translation tool that can assist a software developer in localizing an application.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 4 illustrates a process flow for viewing translated text while an application is running.

DESCRIPTION OF THE EMBODIMENTS

Embodiments of the present invention provide a foreign language translation tool that assists in the localization of an application. In particular, the foreign language translation tool enables translation in the context of a running application. In addition, the tool provides an editing mechanism so that the user may modify or correct the translation of the selected text and allows the user to easily and quickly verify the correctness of translations.

Reference will now be made in detail to exemplary embodiments of the invention, which are illustrated in the accompanying drawings. Wherever possible, the same reference numbers will be used throughout the drawings to refer to the same or like parts.

Figure 1:
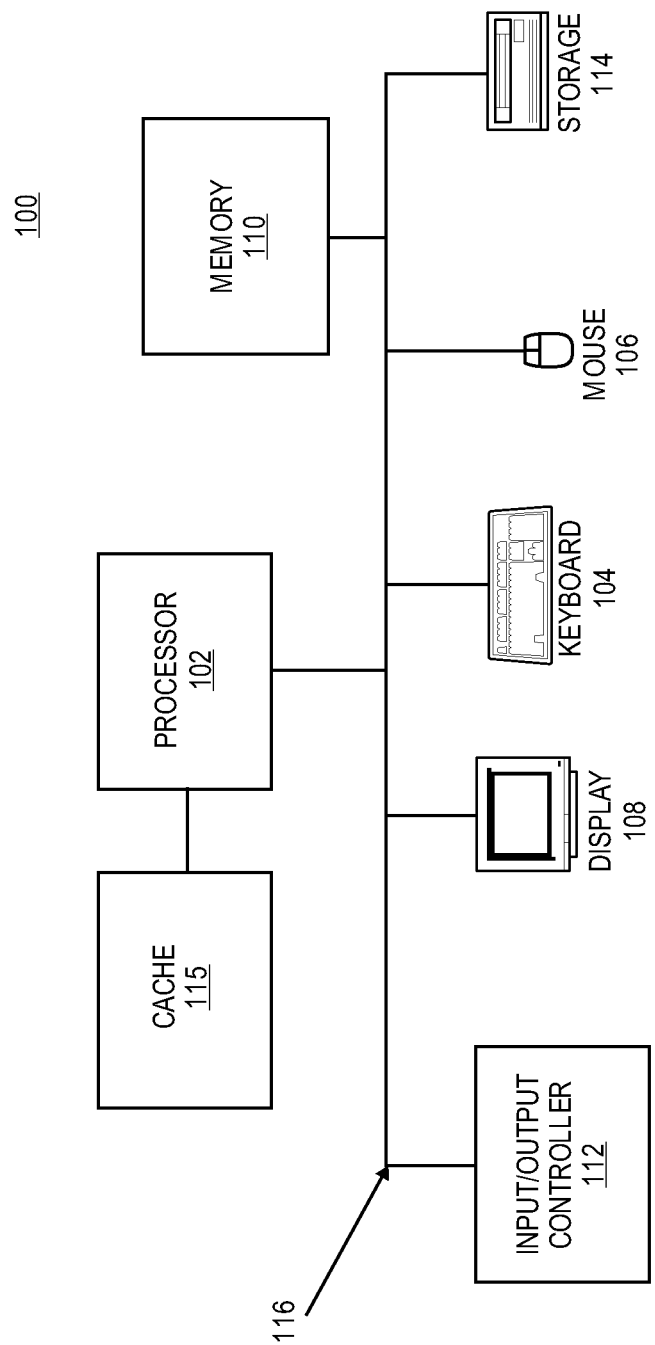
FIG. 1 illustrates a general purpose computer system that is consistent with the principles of the present invention.

FIG. 1 illustrates a general purpose computer system 100 that is consistent with the principles of the present invention. Such computers are well known to those skilled in the art and examples of the components that may be included in computer system 100 will now be described.

As shown, a computer system 100 may include a central processor 102, a keyboard 104, a pointing device 106 (e.g., mouse, or the like), a display 108, a main memory 110, an input/output controller 112, and a storage device 114. Processor 102 may further include a cache memory 115 for storing frequently accessed information. Cache 115 may be an "on-chip" cache or external cache. System 100 may also be provided with additional input/output devices, such as a printer (not shown). The various components of the system 100 communicate through a system bus 116 or similar architecture.

Figure 2:
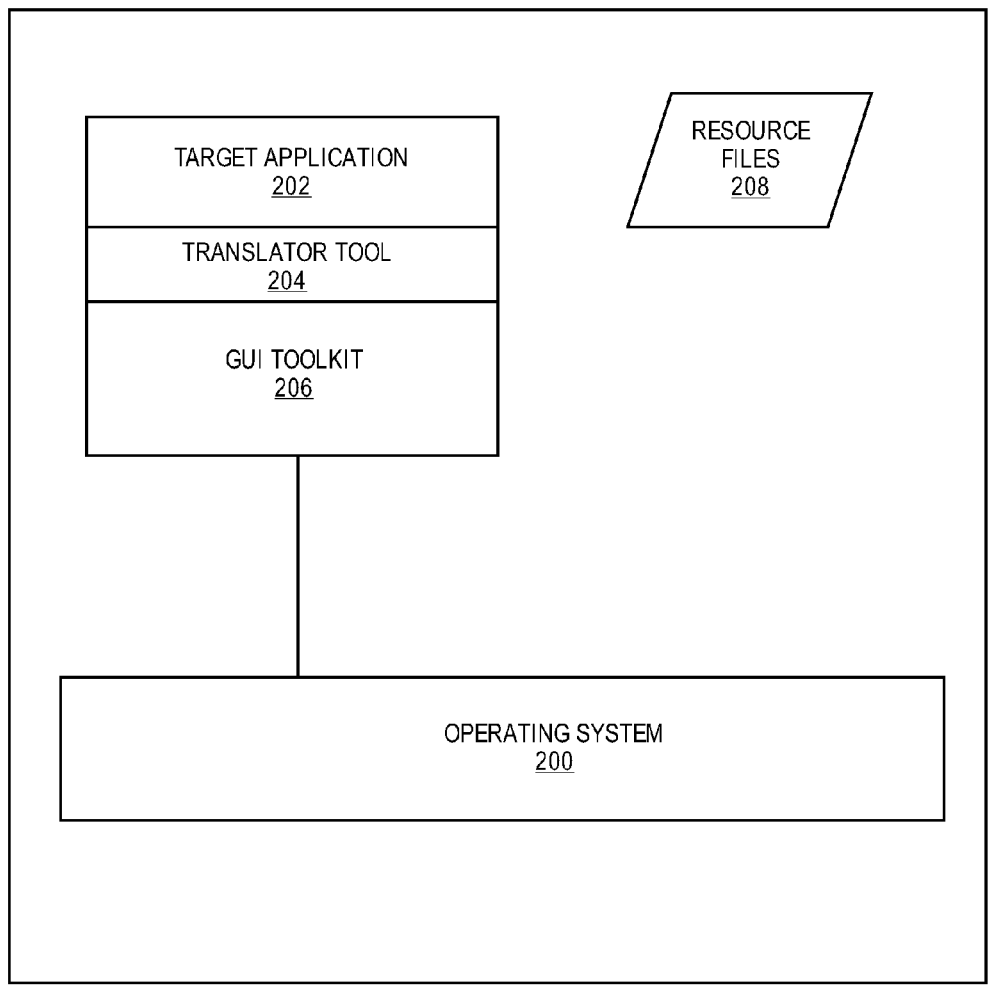
FIG. 2 illustrates a functional block diagram of a system in which one embodiment of the present invention may be implemented.

FIG. 2 illustrates a functional block diagram of system 100 in which one embodiment of the present invention may be implemented. As shown, system 100 comprises an operating system 200, an application 202, a translation tool 204, a graphical user interface (GUI) toolkit 206, and resource files 208. These components will now be further described.

OS 200 is an integrated collection of routines that service the sequencing and processing of programs and applications by system 100. OS 200 may provide many services for computer system 100, such as resource allocation, scheduling, input/output control, and data management. OS 200 may be predominantly software, but may also comprise partial or complete hardware implementations and firmware. Well known examples of operating systems that are consistent with the principles of the present invention include Mac OS by Apple Computer, LINUX, Java and Sun Solaris by Sun Microsystems, Windows by Microsoft Corporation, and the like.

Application 202 is the application which is being localized by a user or software developer. Application 202 may be any type of application, such as a word processor, web browser, etc. One skilled in the art will recognize that application 202 may be a wide variety of types of application.

During operation, application 202 typically uses an original language string as a key to reference a translated language string in resource files 208. Resource files 208 provide pairs of original language strings and translated language strings, and can be language specific.

In some embodiments, application 202 may utilize various text language files. For example, applications that run on the LINUX operating system utilize the "gettext" internationalization library. Typically, source code of an application is modified to use gettext calls. In general, this is done by wrapping strings that the user will see in the "gettext" function. The gettext function then uses the English language strings as keys for looking up translations, and will return the original English string when no translation is available.

Translation tool 204 provides a user interface for viewing and editing text string translations in resource files 208 used by application 202. In addition, translation tool 204 enables viewing and editing text strings in context while an application is running. In general, the context of application 202 may refer to the execution path, user actions, and surrounding text of the current state of application 202. Conventional translation tools are not capable of providing the in-context feature of translation tool 204.

In some embodiments, translation tool 204 is an application or plug-in that is inserted between application 202 and GUI toolkit 206. Alternatively, translation tool 204 may be provided as part of GUI toolkit 206.

Of course one skilled in the art will recognize that translation tool 204 can be implemented for applications running on other operating systems. For example, for applications running on the Microsoft Windows family of operating systems, translation tool 204 may utilize the "catgets" and "loadstring" functions. Translation tool 204 may be adapted to source code in a variety of languages, such as C, C++, Python, Java, PHP, Perl, etc.

GUI toolkit 206 provides the basic building blocks, such as windows, dialog boxes, buttons, etc., used by application 202. GUI toolkit 206 handles user events, such as a user clicking a button or selecting a menu. Various GUI toolkits, such as "GTK+," are well known to those skilled in the art. In addition, one skilled in the art will recognize that GUI toolkit 206 may be implemented as a separate layer that operates on top of OS 200 or may be integrated in OS 200, for example, as an application program interface (API).

Some scenarios of the operation of translation tool 204 will now be described. In general, translation tool 204 allows anyone (such as a user, translator, or developer) to view, edit, and confirm translations of text while application 202 is running.

Unlike typical translation processes, translation tool 204 allows this translation to be viewed during the "live" operation of application 202. As noted above, localization of a software application such as application 202 must typically undergo a tedious multi-step process to perform and verify translations. For example, a translator must edit the resource file, compile it, and restart the application to verify any changes. When translating language strings, it may not always be clear what was intended because the translator did not have the benefit of viewing the result in the context of the running application. In contrast, translation tool 204 allows the user to avoid many of these steps because the translation and verification is possible in the context of the running of application 202 without interfering with its operation. Thus, translation tool 204 allows the user to rapidly evaluate the usage of the text and the accuracy of the translation. In addition, translation tool 204 allows the user to test various operational scenarios of application 202 and activate translation tool 204 on-the-fly.

Figure 3:
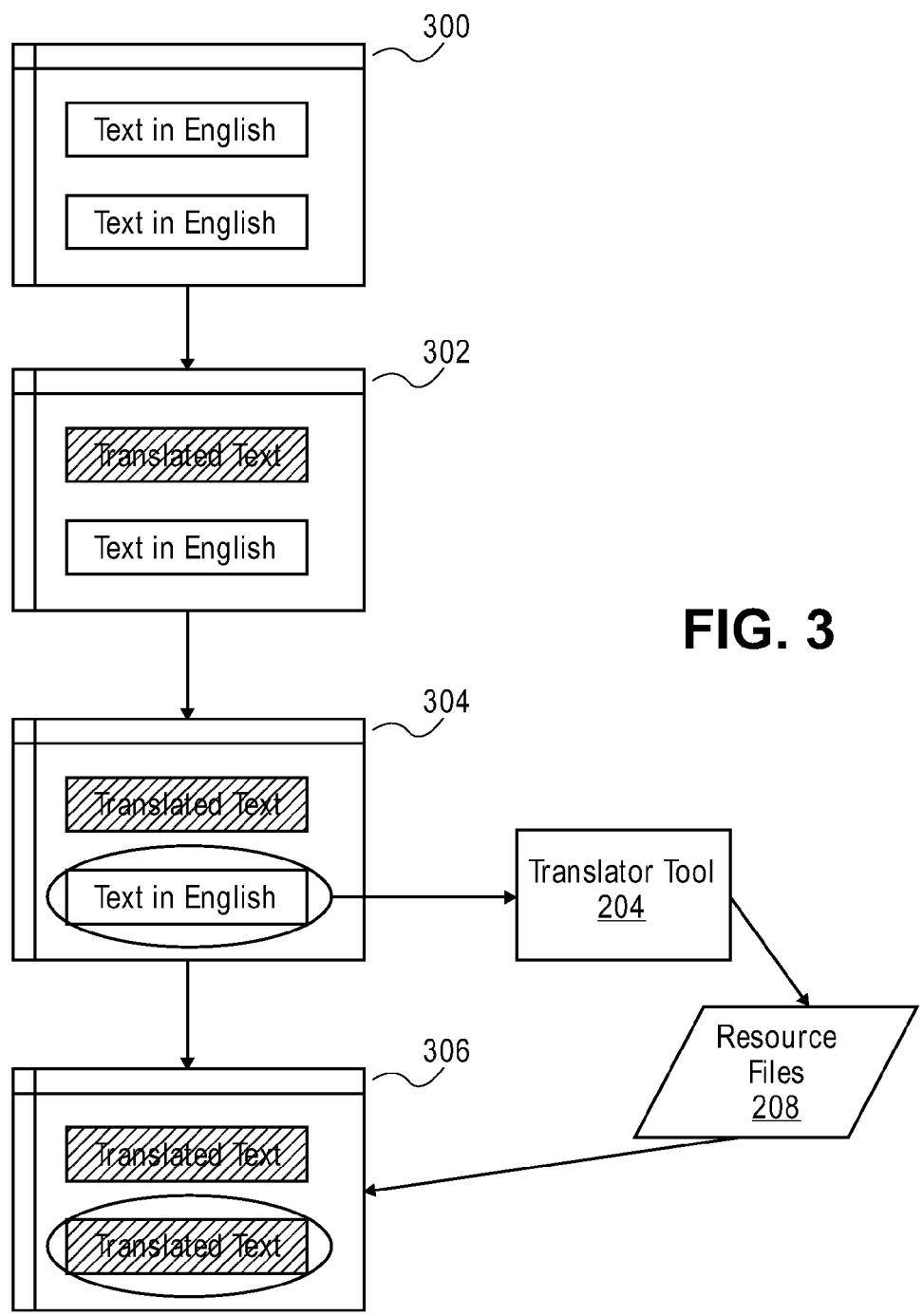
FIG. 3 illustrates a process flow for editing translated text while an application is running.

FIGS. 3 and 4 are provided to illustrate two scenarios that may be related to localization of application 202. FIG. 3 illustrates a process flow for editing translated text while application 202 is running. In this scenario, a user wishes to edit a translation for application 202 while it is running. FIG. 4 illustrates a process flow for viewing translated text while an application is running. In this scenario, translation tool 204 enables the user to toggle or switch between translations or view them together. For example, translation tool 204 may display different translations together simultaneously side-by-side in windows. These figures will now be further described.

FIG. 3 shows an initial message 300 from application 202 that comprises various text strings that are in the English language. While application 202 is running, the user may initiate the translation of application 202 for example with hot-key stroke, or other form of input. This activates translation tool 204, which may run as a (normally dormant) layer of the application or as plug-in between application 202 and OS 200. When activated, translation tool 204 acts upon the selected string, first by identifying it from the resource files 208. Translation tool 204 will then present the user the original string and any current translation from the resource files 208, for example, by utilizing a "gettext" call.

As shown in window 302, some of the English text does not have a corresponding translation, and thus, only part of the text has been translated. Thus, translation tool 204 is invoked to correct the missing translation.

As shown in window 304, the user has selected the un-translated English text. At this point, the user may then edit or provide a translation for the un-translated text. In response, translation tool 204 appropriately modifies entries in resource files 208 to record the translation.

Of note, since this editing is being performed during live operation of application 202, the user is assured that their edits have been entered for the correct context of application 202. Accordingly, as shown in window 306, the un-translated text has now been translated and application 202 may continue with its operations.

FIG. 4 illustrates a process flow for viewing translated text while application 202 is running. For example, a user may be testing the operations of application 202 and wish to view and verify the translations for window 400 in various contexts.

Next, the user may activate translation tool 204 (e.g., with a hot-key stroke, or other form of input) to view the translations of the English text in message 400. Accordingly, application 202 responds by displaying window 402, which includes the translated text. At this point, the user may wish to verify or view the translation more carefully. Thus, translation tool 204 may provide a feature where the user can toggle or switch between translations, or view two or more translations at the same time.

For example, as shown in FIG. 4, translation tool 204 may display multiple windows with the various language versions of the selected text. In some embodiments, the user may switch between view #1 and view #2 to evaluate the translation at this context of application 202. Alternatively, translation tool 204 may provide a feature where multiple translations appear simultaneously. For example, as shown in FIG. 4, translation tool 204 may provide a window that shows both translations together side by side at the same time. Of course, other graphical arrangements may be implemented by embodiments of the present invention.

Other embodiments of the invention will be apparent to those skilled in the art from consideration of the specification and practice of the invention disclosed herein. For example, one skilled in the art will recognize that an end-user may find translation tool 204 useful. That is, an end-user may occasionally wish to view or edit various translations used by application 202. It is intended that the specification and examples be considered as exemplary only, with a true scope and spirit of the invention being indicated by the following claims.

What is claimed is:

1. A method comprising:

displaying a first instance of a window of a user interface of an application, wherein the first instance of the window comprises text in a first natural language, wherein the text in the first natural language is retrieved from a first resource file of the application;

identifying the first resource file of the application containing the text in the first natural language displayed in the first instance of the window and a second resource file of the application associated with the first resource file of the application;

intercepting, with a processor, a call by the application to a graphical user interface toolkit;

calling a translation of the text in the first natural language into a second natural language from the graphical user interface toolkit, wherein the translation of the text into the second natural language is stored in the second resource file and the translation of the text into the second natural language comprises a portion of text in the second natural language and a portion of text remaining in the first natural language;

displaying, in relation to an execution path of the application and a user action associated with the application, a second instance of the window of the user interface of the application, wherein the second instance of the window comprises the translation of the text into the second natural language, wherein the translation of the text into the second natural language is retrieved from the second resource file of the application;

receiving, via the second instance of the window and concurrent with execution of the application, an edit of the portion of text remaining in the first natural language of the translation of the text into the second natural language; and storing the edited translation of the text into the second natural language in the second resource file.

2. The method of claim 1, wherein the edited translation of the text into the second natural language is stored while the application is running.

3. The method of claim 1, wherein the second instance of the window comprises multiple translations of the text in the first natural language.

4. The method of claim 1, wherein the first instance of the window and the second instance of the window are displayed simultaneously.

5. The method of claim 4, wherein the first instance of the window and the second instance of the window are displayed side-by-side.

6. The method of claim 1, wherein the second instance of the window is displayed in response to user input.

7. The method of claim 6, wherein the second instance of the window is displayed in response to a hot-key stroke.

8. The method of claim 1, wherein the first instance of the window and the second instance of the window are the same size.

9. A non-transitory computer readable medium comprising computer-executable instructions for performing operations comprising:

displaying a first instance of a window of a user interface of an application, wherein the first instance of the window comprises text in a first natural language, wherein the text in the first natural language is retrieved from a first resource file of the application;

identifying the first resource file of the application containing the text in the first natural language displayed in the first instance of the window and a second resource file of the application associated with the first resource file of the application;

intercepting, with a processor, a call by the application to a graphical user interface toolkit;

calling a translation of the text in the first natural language into a second natural language from the graphical user interface toolkit, wherein the translation of the text into the second natural language is stored in the second resource file and the translation of the text into the second natural language comprises a portion of text in the second natural language and a portion of text remaining in the first natural language;

displaying, in relation to an execution path of the application and a user action associated with the application, a second instance of the window of the user interface of the application, wherein the second instance of the window comprises the translation of the text into the second natural language, wherein the translation of the text into the second natural language is retrieved from a second resource file of the application associated with the first resource file of the application;

receiving, via the second instance of the window and concurrent with execution of the application, an edit of the portion of text remaining in the first natural language of the translation of the text into the second natural language; and storing the edited translation of the text into the second natural language in the second resource file.

10. A computer comprising:

a processor to execute instructions; and a memory to store instructions, which when executed by the processor, causes the computer to:

display a first instance of a window of a user interface of an application, wherein the first instance of the window comprises text in a first natural language, wherein the text in the first natural language is retrieved from a first resource file of the application;

identify the first resource file of the application containing the text in the first natural language displayed in the first instance of the window and a second resource file of the application associated with the first resource file of the application;

intercept a call by the application to a graphical user interface toolkit;

call a translation of the text in the first natural language into a second natural language from the graphical user interface toolkit, wherein the translation of the text into the second natural language is stored in the second resource file and the translation of the text into the second natural language comprises a portion of text in the second natural language and a portion of text remaining in the first natural language;

display, in relation to an execution path of the application and a user action associated with the application, a second instance of the window of the user interface of the application, wherein the second instance of the window comprises the translation of the text into the second natural language, wherein the translation of the text into the second natural language is retrieved from a second resource file of the application associated with the first resource file of the application;

receive, via the second instance of the window and concurrent with execution of the application, an edit of the portion of text remaining in the first natural language of the translation of the text into the second natural language; and store the edited translation of the text into the second natural language in the second resource file.

11. The computer of claim 10, wherein the processor is to execute an operating system stored in the memory and the operating system is an open-source operating system.

12. The computer of claim 10, wherein the resource files are retrieved by a graphical user interface toolkit and the graphical user interface toolkit is a GTK+ toolkit.

13. The computer of claim 10, wherein the resource files are retrieved by a graphical user interface toolkit and the graphical user interface toolkit is a component of an operating system.

14. The computer of claim 10, wherein the display of the second instance window is invoked based on user input.

15. The computer of claim 10, wherein the second instance of the window comprises multiple translations of the text in the first natural language.

16. The computer of claim 15, wherein the second instance of the window displays different resource strings for each of the multiple translations in view of user input.

17. The computer of claim 15, wherein the second instance of the window switches display between different resource strings for each of the multiple translations based on user input.

* * * * *